US010020890B2

(12) United States Patent
Cho et al.

(10) Patent No.: US 10,020,890 B2
(45) Date of Patent: Jul. 10, 2018

(54) HOST UNIT AND REMOTE RADIO HEAD FOR DISTRIBUTED ANTENNA SYSTEM SUPPORTING LARGE DATA TRAFFIC

(71) Applicant: ELECTRONICS AND TELECOMMUNICATIONS RESEARCH INSTITUTE, Daejeon (KR)

(72) Inventors: Seung-Hyun Cho, Sejong-si (KR); Hwan Seok Chung, Daejeon (KR); Minkyu Sung, Seoul (KR); Jong Hyun Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/640,687

(22) Filed: Jul. 3, 2017

(65) Prior Publication Data
US 2018/0152246 A1    May 31, 2018

(30) Foreign Application Priority Data
Nov. 29, 2016    (KR) .......................... 10-2016-0160862

(51) Int. Cl.
*H04B 10/00*    (2013.01)
*H04B 10/40*    (2013.01)
(Continued)

(52) U.S. Cl.
CPC ............... *H04B 10/40* (2013.01); *H04B 7/04* (2013.01); *H04L 5/14* (2013.01); *H04L 7/0075* (2013.01)

(58) Field of Classification Search
CPC .. H04B 10/40; H04B 7/04; H04L 5/14; H04L 7/0075
(Continued)

(56) References Cited

U.S. PATENT DOCUMENTS 8,260,145 B2 *   9/2012  Gupta ................. H04L 27/2096
                                                        398/115
8,817,848 B2 *   8/2014  Lemson ........... H04B 10/25753
                                                         370/279
(Continued)

FOREIGN PATENT DOCUMENTS

KR       10-0871257 B1     11/2008
KR    10-2009-0046527 A      5/2009
(Continued)

*Primary Examiner* — M. R. Sedighian
(74) *Attorney, Agent, or Firm* — LRK Patent Law Firm

(57) ABSTRACT

A remote radio head disposed between a baseband unit and a host unit. The remote radio head may transmit and receive a digital optical signal to the baseband unit, transmit and receive an analog optical signal to the host unit, and convert the digital optical signal and the analog optical signal, a frequency of the analog optical signal transmitted and received by the remote radio head and the host unit may be an intermediate frequency of a baseband, the host unit may be disposed between the remote radio head and a radio unit, the host unit and the radio unit may transmit and receive the analog optical signal, and the frequency of the analog optical signal transmitted and received by the host unit and the radio unit may be the intermediate frequency with a baseband signal.

9 Claims, 3 Drawing Sheets

(51) Int. Cl.
*H04L 5/14* (2006.01)
*H04L 7/00* (2006.01)
*H04B 7/04* (2017.01)

(58) Field of Classification Search
USPC .......................................................... 398/115
See application file for complete search history.

(56) References Cited

U.S. PATENT DOCUMENTS

| | | | |
|---|---|---|---|
| 9,473,187 B2 * | 10/2016 | Polehn | ..................... H04B 1/38 |
| 9,871,593 B2 * | 1/2018 | Kim | ..................... G02B 6/4293 |
| 9,877,356 B2 * | 1/2018 | Kim | ....................... H04B 7/022 |
| 2014/0233954 A1 | 8/2014 | Lee et al. | |
| 2016/0285553 A1 | 9/2016 | Cho et al. | |
| 2017/0047996 A1 * | 2/2017 | Feng | ................. H04B 10/2575 |

FOREIGN PATENT DOCUMENTS

| | | |
|---|---|---|
| KR | 10-2013-0111064 A | 10/2013 |
| KR | 10-1403822 B1 | 6/2014 |
| KR | 10-2016-0106996 A | 9/2016 |
| KR | 10-2016-0116058 A | 10/2016 |
| WO | 2012/024343 A1 | 2/2012 |

* cited by examiner

HOST UNIT AND REMOTE RADIO HEAD FOR DISTRIBUTED ANTENNA SYSTEM SUPPORTING LARGE DATA TRAFFIC

CROSS-REFERENCE TO RELATED APPLICATION(S)

This application claims the priority benefit of Korean Patent Application No. 10-2016-0160862, filed on Nov. 29, 2016, in the Korean Intellectual Property Office, the disclosure of which is incorporated herein by reference for all purposes.

BACKGROUND

1. Field

One or more example embodiments relate to a distributed antenna system for transmitting and receiving a large volume of data.

2. Description of Related Art

When one antenna covers a relatively wide area, the area may include a shadow area in which communication is interrupted. The term shadow area may indicate a space in which wireless signals transmitted and to be received by a user terminal and an antenna are blocked with respect to the user terminal wirelessly connected to the antenna. An indoor environment, for example, an inside of a building, may contain various objects that may block wireless signals. For example, a wireless signal may be blocked by a wall or a quality of the wireless signal may deteriorate because of the wall. Since people mainly live indoors, it is necessary to support a wireless service, considering indoor environments may have shadow areas.

A distributed antenna system (DAS) is a system for spatially distributing and disposing a radio equipment including antennas in order to solve a problem of a shadow area under an indoor environment. Antennas having relatively small output values under the indoor environment may be disposed dispersively such that a shadow area under an indoor environment is minimized.

With the recent spread of mobile devices such as a smartphone and a tablet PC, wireless data traffic handled by mobile devices is increasing. It is expected to keep increasing and studies on broadband wireless networks are being conducted.

SUMMARY

An aspect provides a distributed antenna system including a host unit and a remote radio head for supporting a large amount of wireless data transmission.

According to an aspect, there is provided a remote radio head connected to a baseband unit and a host unit including a digital optical transceiver configured to convert a digital baseband optical signal received from the baseband unit into a digital electric signal, a digital signal processor configured to deframe the converted digital electric signal, a digital-to-analog converter configured to convert the deframed digital electric signal into an analog electric signal, an analog front-end controller configured to adjust a level of the analog electric signal considering for optical transmission to the host unit, a combiner configured to combine the analog electric signal of which the level is adjusted with at least one of a frequency synchronization signal, a time division duplex (TDD) switching control signal, or a monitoring and management signal for the host unit, and an analog optical transceiver configured to convert, into an analog optical signal, the analog electric signal combined with at least one of the frequency synchronization signal, the TDD switching control signal, or the monitoring and management signal.

The remote radio head may further include a switch configured to select and distribute the deframed digital electric signal for each of a plurality of host units, when multiple host units are connected to the remote radio head simultaneously, wherein the digital-to-analog converter is also configured to convert the received digital electric signal into analog electric signal for each of the host units.

The digital signal processor can be configured to separate, from the digital electric signal, digital information associated with the at least one of the frequency synchronization signal, the TDD switching control signal, or the monitoring and management signal.

The combiner may be configured to combine the analog electric signal with the at least one of the frequency synchronization signal, the TDD switching control signal, or the monitoring and management signal determined based on the deframed digital information.

According to another aspect, there is provided a host unit connected to a remote radio head and a radio unit including a first analog optical transceiver configured to convert a baseband analog optical signal received from the remote radio head into a baseband analog electric signal, a splitter configured to separate, from the converted analog electric signal, at least one of a frequency synchronization signal, a time division duplex (TDD) switching control signal, or a monitoring and management signal for the host unit, an analog front-end controller configured to adjust the amplitude of the analog electric signal for optical transmission between the host unit and the radio unit, a combiner configured to combine the analog electric signal of which the amplitude is adjusted with at least one of the frequency synchronization signal, the TDD switching control signal, or the monitoring and management signal, and a second analog optical transceiver configured to convert the combined analog electric signal into an analog optical signal such that the combined analog electric signal is transmitted to the radio unit.

The host unit may further include a controller for monitoring and management signal configured to control the radio unit in response to the monitoring and management signal.

The analog front-end controller may include at least one of an amplifier or an attenuator configured to adjust the amplitude of the analog electric signal.

The host unit may further include at least one of a frequency synchronization signal controller configured to adjust the amplitude of the frequency synchronization signal input to the combiner for optical transmission between the host unit and the radio unit, a time division duplex (TDD) signal controller configured to adjust the amplitude of the TDD switching control signal input to the combiner for optical transmission between the host unit and the radio unit, or a monitoring and management signal controller configured to adjust the amplitude of the monitoring and management signal input to the combiner for optical transmission between the host unit and the radio unit.

According to still another aspect, there is provided an extended remote radio head connected to a basic remote radio head including a frequency converter configured to convert an analog electric signal with a frequency of a millimeter wave band transmitted to a host unit by the basic remote radio head into an analog electric signal with an intermediate frequency, a combiner configured to combine the converted analog electric signal with at least one of a frequency synchronization signal, a time division duplex (TDD) switching control signal, or a monitoring and management signal for the host unit, and an analog optical transceiver configured to convert the combined analog electric signal into an analog optical signal such that the combined analog electric signal is transmitted to the host unit.

According to a further aspect, there is provided a remote radio head connected to a host unit and a baseband unit including a first digital optical transceiver configured to convert a digital optical signal received from the baseband unit into a digital electric signal, a first digital signal processor configured to deframe the converted digital electric signal, a switch configured to switch the deframed digital electric signal for each of a plurality of host units when the multiple host units are connected to the remote radio head, a second digital signal processor configured to combine the switched digital electric signal with at least one of a frequency synchronization signal, a time division duplex (TDD) switching control signal, or a monitoring and management signal for the host unit, and a second digital optical transceiver configured to convert the digital electric signal combined with the at least one of the frequency synchronization signal, the TDD switching control signal, or the monitoring and management signal into the digital optical signal such that the digital electric signal is transmitted to the host unit.

The first digital signal processor may be configured to separate, from the converted digital electric signal, at least one of the frequency synchronization signal, the TDD switching control signal, or the monitoring and management signal.

According to still another aspect, there is provided a host unit and a remote radio head configured to support a large volume of wireless transmission.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
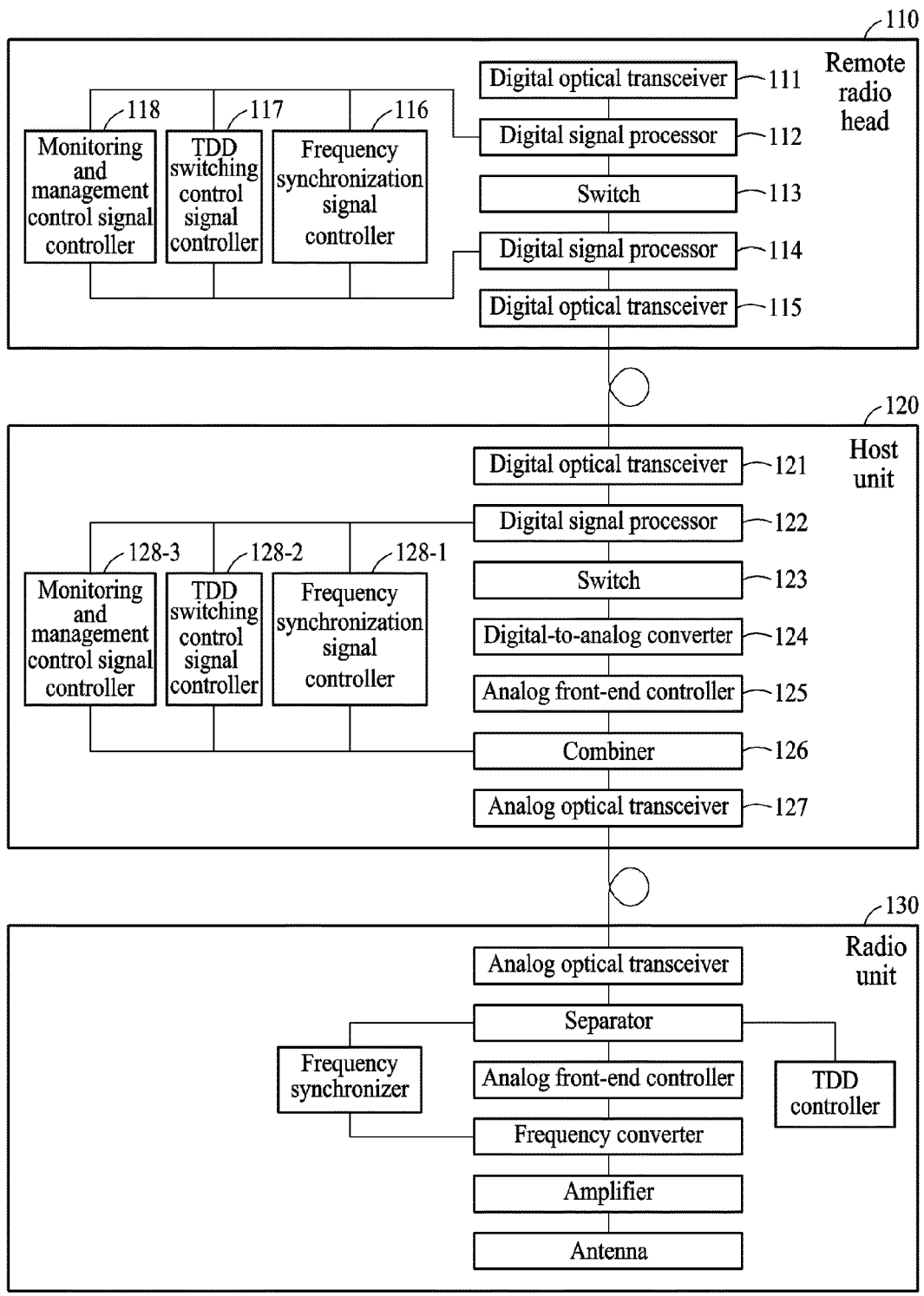
FIG. 1 illustrates structures of a remote radio head, a host unit, and a radio unit based on digital optical transmission scheme according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, examples are described in detail with reference to the accompanying drawings. Like reference numerals in the drawings denote like elements, and a known function or configuration will be omitted herein.

FIG. 1 illustrates structures of a remote radio head 110, a host unit 120, and a radio unit 130 based on a digital optical transmission according to an example embodiment.

Referring to FIG. 1, the remote radio head 110 includes a baseband unit and a digital optical transceiver 111 configured to transmit and receive a digital optical signal. In a downstream direction, a baseband unit may generate a digital electric signal through digital sampling. In more detail, the baseband unit may generate the digital electric signal for 5th generation mobile communication. The baseband unit may convert the generated digital electric signal into a digital optical signal through digital framing procedure. The converted digital optical signal may be used for a mobile fronthaul transmission. The baseband unit may transmit the converted digital optical signal to the remote radio head 110. In a downstream direction, the digital optical transceiver 111 may convert the received digital optical signal into the digital electric signal.

Referring to FIG. 1, the remote radio head 110 includes a digital signal processor 112 configured to perform deframing procedure on the electrically converted digital signal.

Deframing indicates dividing a frame included in the digital electric signal into a header portion and a payload portion. For example, the digital signal processor 112 may divide the frame included in the digital electric signal into a header portion of a 2-byte length and a payload portion of a 4-byte length. That is, a length of the frame of the digital electric signal may be 6 bytes. The digital signal processor 112 may separate, from the electrically converted digital signal, at least one of a frequency synchronization signal, a time division duplex (TDD) switching control signal, or a monitoring and management signal for the host unit 120. The digital signal processor 112 may transmit the separated frequency synchronization signal to a frequency synchronization signal controller 116. The digital signal processor 112 may transmit the separated TDD switching control signal to a TDD switching control signal controller 117. The digital signal processor 112 may transmit the separated monitoring and management signal to a monitoring and management signal controller 118.

Referring to FIG. 1, when a plurality of host units are connected to the remote radio head 110, the remote radio head 110 includes a switch 113 configured to select and distribute the deframed digital electric signal in response to the host units. That is, pieces of data included in the digital electric signal may be provided for each of the host units depending on the predetermined signal path by the baseband unit in central office. The digital electric signal may support a system with multiple-input multiple-output (MIMO) antenna, a multi-sector, or a multi-frequency assignment (FA). The switch 113 may switch the digital electric signal in different paths depending on whether the digital electric signal supports the MIMO antenna, the multi-sector, or the multi-FA.

Referring to FIG. 1, the remote radio head 110 includes a digital signal processor 114 configured to generate a digital frame from the switched digital electric signal. The digital signal processor 114 may generate the digital frame by combining the digital electric data signal with at least one of the synchronization signal from the frequency synchronization signal controller 116, the TDD switching control signal controller 117, or the monitoring and management signal controller 118. That is, the digital electric signal generated by the digital signal processor 114 includes the digital frame combined with at least one of the frequency synchronization signal, the TDD switching control signal, or the monitoring and management signal. The digital signal processor 114 may combine the digital data frame with the frequency synchronization signal, the TDD switching control signal, or the monitoring and management signal based on predetermined paths of the digital electric signal.

Referring to FIG. 1, the remote radio head 110 includes a digital optical transceiver 115 configured to convert the digital electric signal into the digital optical signal such that the digital electric signal including the digital frame is transmitted to the host unit 120. The remote radio head 110 may transmit the digital optical signal to the host unit 120 through an optical cable. When a plurality of host units are connected to the remote radio head 110, digital optical signals may be transmitted to different host units based on the predetermined paths by baseband unit in central office.

The digital optical signal generated by the digital optical transceiver 115 may be transmitted to a digital optical transceiver 121 of the host unit 120. The host unit 120 includes the digital optical transceiver 121 configured to convert the digital optical signal transmitted by the remote radio head 110 into the digital electric signal.

Referring to FIG. 1, the host unit 120 includes a digital signal processor 122 configured to deframe the converted digital electric signal. The digital signal processor 122 may separate, from the digital electric signal, at least one of the frequency synchronization signal, the TDD switching control signal, or the monitoring and management signal for the host unit 120. Referring to FIG. 1, the digital signal processor 122 may transmit the separated frequency synchronization signal to a frequency synchronization signal controller 128-1. The digital signal processor 122 may transmit the separated TDD switching control signal to a TDD switching control signal controller 128-2. The digital signal processor 122 may transmit the separated monitoring and management signal to a monitoring and management signal controller 128-3.

Referring to FIG. 1, when a plurality of radio units are connected to the host unit 120, the host unit 120 includes a switch 123 configured to select and distribute the deframed digital electric signal in response to the radio unit. The switch 123 may classify the path of digital electric signal depending on the predetermined radio unit.

Referring to FIG. 1, the host unit 120 includes a digital-to-analog converter 124 configured to convert the digital electric signal into an analog electric signal. A frequency of the analog electric signal generated by the digital-to-analog converter 124 may be an intermediate frequency with a baseband signal. The digital electric signal received by the digital-to-analog converter 124 may be a signal classified for each of the radio unit by the switch 123.

Referring to FIG. 1, the host unit 120 includes an analog front-end controller 125 configured to adjust the amplitude of the converted analog electric signal. The analog front-end controller 125 may adjust the amplitude of the analog electric signal for optical transmission between the host unit 120 and the radio unit 130. The analog front-end controller 125 includes an amplifier or an attenuator configured to adjust the amplitude of the analog electric signal.

Referring to FIG. 1, the host unit 120 includes a combiner 126 configured to combine the analog electric signal of which the intensity is adjusted with at least one of the frequency synchronization signal, the TDD switching control signal, or the monitoring and management signal. The combiner 126 may combine the analog electric signal with the frequency synchronization signal received from the frequency synchronization signal controller 128-1. The combiner 126 may combine the analog electric signal with the TDD switching control signal received from the TDD switching control signal controller 128-2. The combiner 126 may combine the analog electric signal with the monitoring and management signal received from the monitoring and management signal controller 128-3.

Referring to FIG. 1, the host unit 120 includes an analog optical transceiver 127 configured to convert the analog electric signal into an analog optical signal such that the analog electric signal is transmitted to the radio unit 130. The analog optical signal converted by the analog optical transceiver 127 may be transmitted to the radio unit 130 through the optical cable.

The remote radio head 110, the host unit 120, and the radio unit 130 may reversely perform the above-described operations in an upstream direction. Referring to FIG. 1, the analog optical transceiver 127 in the host unit 120 may receive the analog optical signal transmitted by the radio unit 130. The analog optical transceiver 127 may convert the received analog optical signal into the analog electric signal.

The combiner 126 may separate at least one of the frequency synchronization signal, the TDD switching control signal, or the monitoring and management signal from the converted analog electric signal. The analog front-end controller 125 may adjust the amplitude of the analog electric signal from which at least one of the frequency synchronization signal, the TDD switching control signal, or the monitoring and management signal is separated for optical transmission between the remote radio head 110 and the host unit 120. The digital-to-analog converter 124 may convert the digital electric signal into the analog electric signal. When the radio units are connected to the host unit 120, the switch 123 may switch a plurality of digital electric signals generated by each of the radio units in predetermined single path. The digital signal processor 122 may combine the switched digital electric signals with at least one of the frequency synchronization signal, the TDD switching control signal, or the monitoring and management signal. The digital optical transceiver 121 may convert the combined digital electric signal into the digital optical signal. The converted digital optical signal may be transmitted to the remote radio head 110 through the optical cable.

The digital optical transceiver 115 in the remote radio head 110 may convert the received digital optical signal into the digital electric signal. The digital signal processor 114 may separate the at least one of the frequency synchronization signal, the TDD switching control signal, or the monitoring and management signal from the converted digital electric signal. The separated frequency synchronization signal, the TDD switching control signal, and the monitoring and management signal may be used to transmit the digital electric signal to the baseband unit. When multiple host units are connected to the remote radio head 110, the switch 113 may switch a plurality of digital electric signals generated by each of the host units in predetermined single path. The digital signal processor 112 may combine the switched digital electric signals with the at least one of the frequency synchronization signal, the TDD switching control signal, or the monitoring and management signal. For optical transmission between the remote radio head 110 and the baseband unit, the frequency synchronization signal controller 116, the TDD switching control signal controller 117, and the monitoring and management signal controller 118 may generate the frequency synchronization signal, the TDD switching control signal, and the monitoring and management signal, respectively. The digital optical transceiver 111 may convert the combined digital electric signal into the digital optical signal. The converted digital optical signal may be transmitted to the baseband unit through the optical cable.

Figure 2:
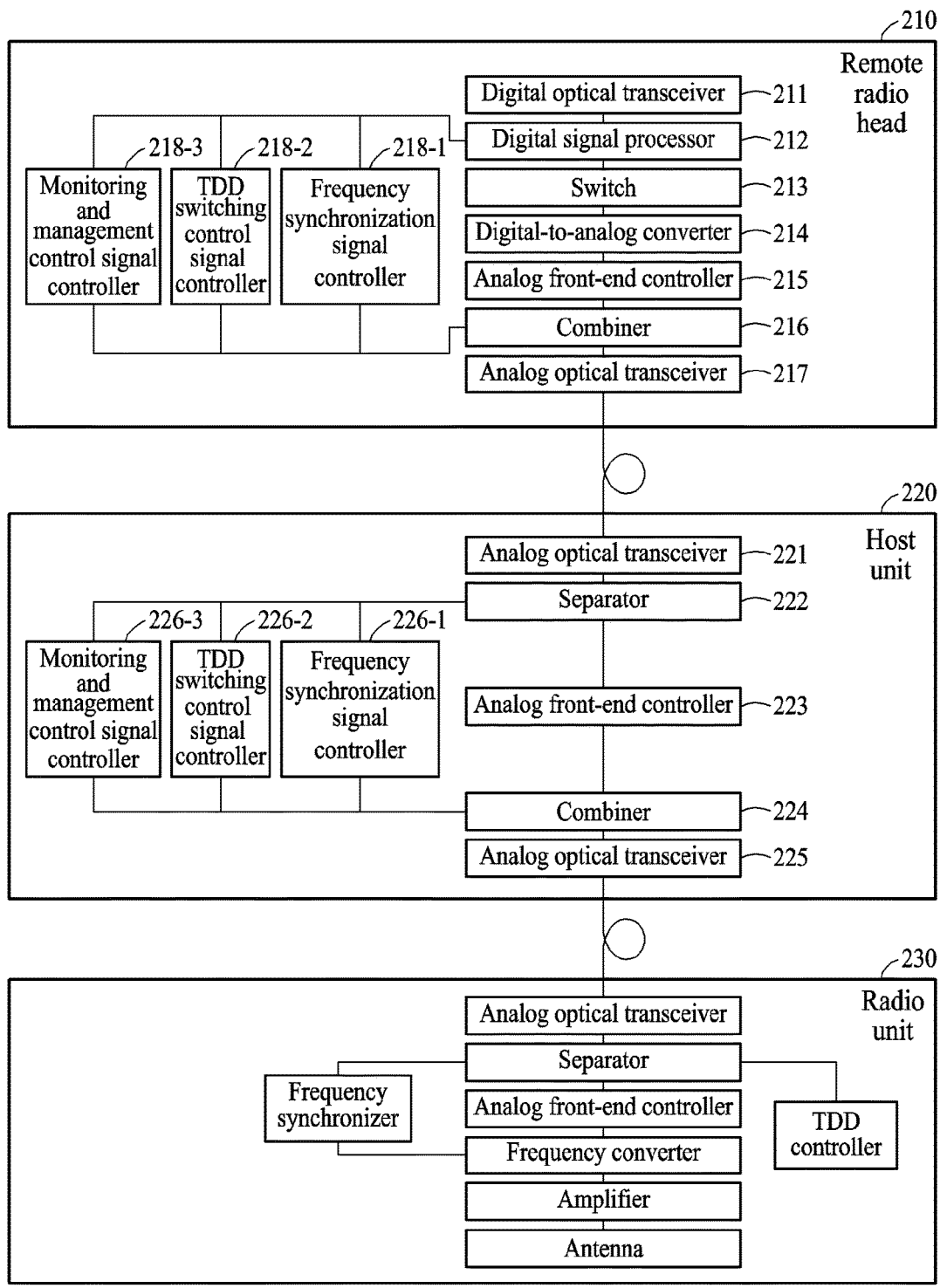
FIG. 2 illustrates structures of a remote radio head, a host unit, and a radio unit based on analog optical transmission according to an example embodiment.

FIG. 2 illustrates structures of a remote radio head 210, a host unit 220, and a radio unit 230 based on an analog optical transmission according to an example embodiment. Referring to FIG. 2, the remote radio head 210 may be connected to the host unit 220 using analog optical transceivers 217 and 221 configured to transmit or receive an analog optical signal having an intermediate frequency of a baseband.

In a downstream direction, a baseband unit comprising mobile fronthaul may generate a digital electric signal from a mobile signal for 5th generation wireless communication. The baseband unit may convert the generated digital electric signal into a digital optical signal including digital framing procedure. The converted digital optical signal may be used for mobile fronthaul transmission. The baseband unit may transmit the converted digital optical signal to the remote radio head 210.

Referring to FIG. 2, the remote radio head 210 includes a digital optical transceiver 211 configured to convert the digital optical signal received from the baseband unit into the digital electric signal. The remote radio head 210 includes a digital signal processor 212 configured to deframe the converted digital electric signal. The digital signal processor 212 may perform digital binary signal conversion with respect to the digital electric signal.

Referring to FIG. 2, the digital signal processor 212 may separate, from the digital electric signal, digital information associated with at least one of a frequency synchronization signal, a time division duplex (TDD) switching control signal, or a monitoring and management signal for the host unit 220. The digital signal processor 212 may transfer the separated digital information to a frequency synchronization signal controller 218-1, a TDD switching control signal controller 218-2, and a monitoring and management signal controller 218-3.

When a plurality of host units are connected to the remote radio head 210, the remote radio head 210 includes a switch 213 configured to select and distribute the deframed digital electric signal for each of the host units. The switch 213 may determine the predetermined path of the digital electric signal based on each of the host units.

Referring to FIG. 2, the remote radio head 210 includes a digital-to-analog converter 214 configured to convert the switched digital electric signal into an analog electric signal. The digital-to-analog converter 214 may receive the digital electric signal classified for each of the host units. A frequency of the analog electric signal generated by the digital-to-analog converter 214 may be an intermediate frequency with the baseband signal. The intermediate frequency with the baseband signal may correspond to a radio frequency band of a range less than or equal to 10 gigahertz (GHz). Thus, a distortion caused by the analog optical transmission may be minimized. Further, a production cost of the remote radio head 210 and the host unit 220 may be reduced.

Referring to FIG. 2, the remote radio head 210 includes an analog front-end controller 215 configured to adjust the level of the analog electric signal for optical transmission to the host unit 220. The analog front-end controller 215 may adjust the amplitude of waveform of the analog electric signal. The analog front-end controller 215 includes an amplifier or an attenuator configured to adjust the amplitude of the analog electric signal. The analog front-end controller 215 may adjust the amplitude of the analog electric signal such that the intensity is appropriate for optical transmission between the remote radio head 210 and the host unit 220.

Referring to FIG. 2, the remote radio head 210 includes a combiner 216 configured to combine the analog electric data signal with at least one of the frequency synchronization signal, the TDD switching control signal, or the monitoring and management signal for the host unit 220. The combiner 216 may be connected to the frequency synchronization signal controller 218-1, the TDD switching control signal controller 218-2, and the monitoring and management signal controller 218-3.

The frequency synchronization signal controller 218-1 may determine the frequency synchronization signal based on the digital information and then transmit the determined frequency synchronization signal to the combiner 216. The TDD switching control signal controller 218-2 may determine the TDD switching control signal based on the digital information and then transmit the determined TDD switching control signal to the combiner 126. The monitoring and management signal controller 218-3 may determine the monitoring and management signal based on the digital information and then transmit the determined monitoring and management signal to the combiner 216.

Referring to FIG. 2, the remote radio head 210 may receive the frequency synchronization signal from the frequency synchronization signal controller 218-1 and then combine the received frequency synchronization signal with the analog electric data signal. The remote radio head 210 may receive the TDD switching control signal from the TDD switching control signal controller 218-2 and then combine the received TDD switching control signal with the analog electric data signal. The remote radio head 210 may receive the monitoring and management signal from the monitoring and management signal controller 218-3 and then combine the received monitoring and management signal with the analog electric data signal.

Referring to FIG. 2, the remote radio head 210 includes an analog optical transceiver 217 configured to convert the analog electric signal combined with at least one of the frequency synchronization signal, the TDD switching control signal, or the monitoring and management signal into the analog optical signal. The analog optical signal converted by the analog optical transceiver 217 may be transmitted to the host unit 220 through an optical cable.

Referring to FIG. 2, the host unit 220 includes the analog optical transceiver 221 configured to convert the received analog optical signal into the analog electric signal. A frequency of the analog electric signal may be identical to an intermediate frequency with a baseband signal.

Referring to FIG. 2, the host unit 220 includes a separator 222 configured to separate, from the converted analog electric signal, at least one of the frequency synchronization signal, the TDD switching control signal, or the monitoring and management signal for the host unit 220. The separator 222 may transfer the separated frequency synchronization signal, the separated TDD switching control signal, and the separated monitoring and management signal to a frequency synchronization signal controller 226-1, a TDD switching control signal controller 226-2, and a monitoring and management signal controller 226-3, respectively.

The frequency synchronization signal controller 226-1 may perform frequency synchronization procedure with respect to a predetermined frequency based on the received frequency synchronization signal. The TDD switching control signal controller 226-2 may perform time-division duplexing based on the received TDD switching control signal. The monitoring and management signal controller 226-3 may control the host unit 220 based on the received monitoring and management signal.

Referring to FIG. 2, the host unit 220 includes an analog front-end controller 223 configured to adjust the amplitude of the analog electric signal from which at least one of the frequency synchronization signal, the TDD switching control signal, or the monitoring and management signal is separated for optical transmission between the host unit 220 and the radio unit 230. The analog front-end controller 223 may adjust the intensity of waveform of the analog electric signal. The analog front-end controller 223 includes at least one of an amplifier or an attenuator configured to adjust the amplitude of the analog electric signal. The amplitude of the analog electric signal may be appropriate for optical transmission between the host unit 220 and the radio unit 230.

Referring to FIG. 2, the host unit 220 includes a combiner 224 configured to combine the analog electric signal of which the amplitude is adjusted with at least one of the frequency synchronization signal, the TDD switching control signal, or the monitoring and management signal. The combiner 224 may be a radio frequency (RF) combiner. The combiner 224 may be connected to the frequency synchronization signal controller 226-1, the TDD switching control signal controller 226-2, and the monitoring and management signal controller 226-3 in order to receive the frequency synchronization signal, the TDD switching control signal, and the monitoring and management signal.

The analog front-end controller 223 may form the analog electric signal from which at least one of the frequency synchronization signal, the TDD switching control signal, or the monitoring and management signal. The frequency synchronization signal, the TDD switching control signal, and the monitoring and management signal may be formed by the frequency synchronization signal controller 226-1, the TDD switching control signal controller 226-2, and the monitoring and management signal controller 226-3, respectively. That is, the frequency synchronization signal controller 226-1, the TDD switching control signal controller 226-2, and the monitoring and management signal controller 226-3 may adjust the respective intensities of the frequency synchronization signal, the TDD switching control signal, and the monitoring and management signal for optical transmission between the host unit 220 and the radio unit 230.

Referring to FIG. 2, the host unit 220 includes an analog optical transceiver 225 configured to convert the combined analog electric signal into the analog optical signal such that the combined analog electric signal is transmitted to the radio unit 230. The converted analog optical signal may be transmitted to the radio unit 230 through the optical cable. In an upstream direction, the remote radio head 210 and the host unit 220 may perform similar operations described with respect to a downstream direction.

In more detail, with respect to the upstream direction, the combiner 224 may separate the frequency synchronization signal, the TDD switching control signal, and the monitoring and management signal from the analog electric signal converted by the analog optical transceiver 225, and combine the analog electric signal with at least one of the frequency synchronization signal, the TDD switching control signal, or the monitoring and management signal. The combiner 216 may separate the frequency synchronization signal, the TDD switching control signal, and the monitoring and management signal from the analog electric signal converted by the analog optical transceiver 217.

The digital signal processor 212 may combine the analog electric signal with at least one of the frequency synchronization signal, the TDD switching control signal, or the monitoring and management signal. The digital-to-analog converter 214 may convert the analog electric signal formed by the analog front-end controller 215 into a digital electric signal. When multiple host units are connected to the remote radio head 210, a plurality of digital electric signals generated from each of the host units may be switched in a predetermined single path by the switch 213. The digital optical transceiver 211 may convert the digital electric signal into the digital optical signal and then transmit the converted digital optical signal to the baseband unit.

Referring to FIG. 2, the host unit 220 and the radio unit 230 may not perform digital sampling or may not generate a digital frame. Thus, a delay may be reduced more than when the digital electric signal is transmitted. Accordingly, the host unit 220 and the radio unit 230 may transmit and receive a large volume of data with a small delay.

Figure 3:
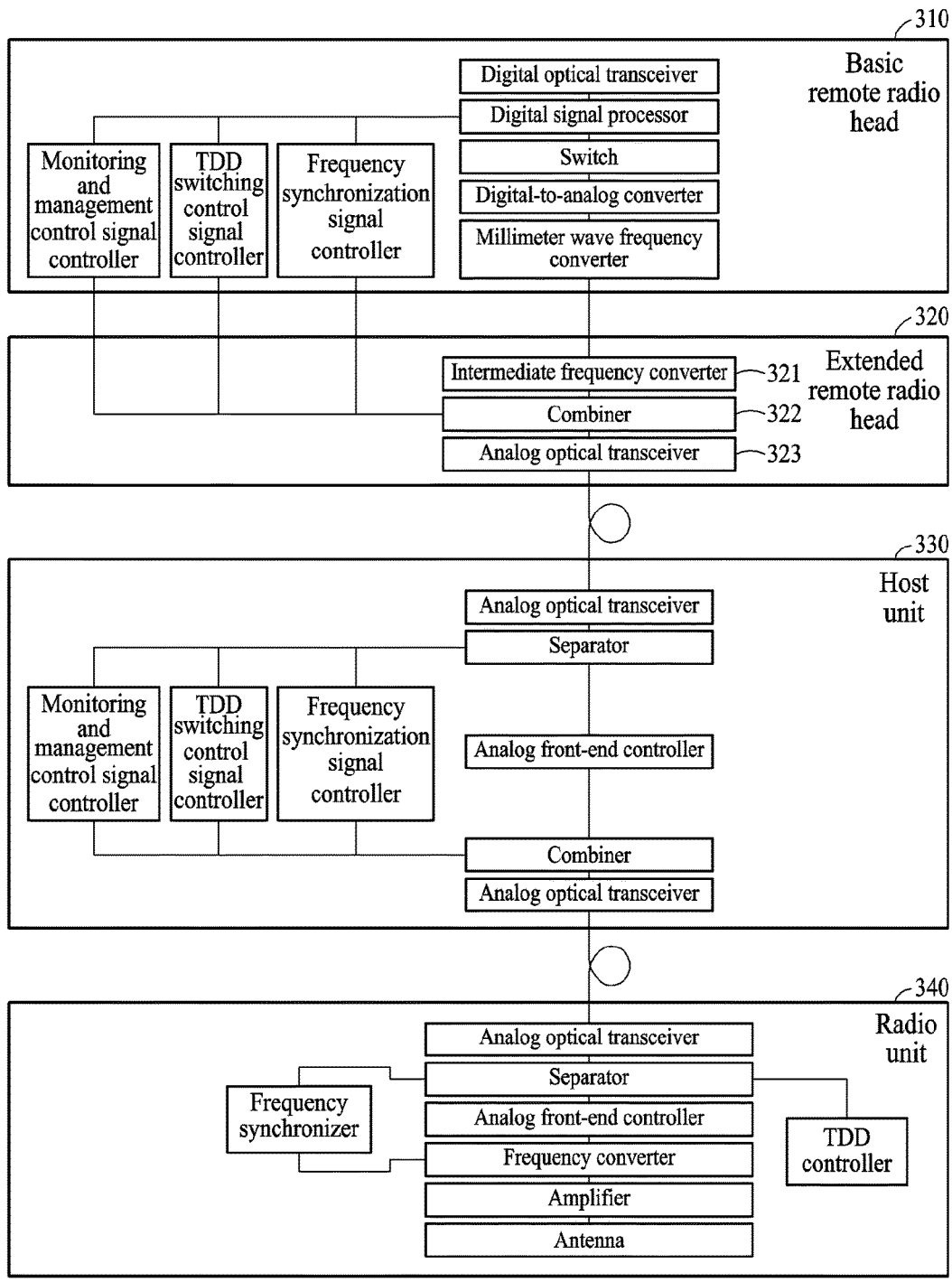
FIG. 3 illustrates structures of a basic remote radio head to which an extended remote radio head is connected, a host unit, and a radio unit according to an example embodiment.

FIG. 3 illustrates structures of a basic remote radio head 310 to which an extended remote radio head 320 is connected, a host unit 330, and a radio unit 340 according to an example embodiment. The extended remote radio head 320 may be included as a portion of the basic remote radio head 310.

Hereinafter, descriptions of operations of devices shown along a downstream direction from the basic remote radio head 310 to the radio unit 340 are provided.

The basic remote radio head 310 may transmit an analog electric signal having a frequency of a millimeter wave band to the extended remote radio head 320. In an example, the basic remote radio head 310 may directly transmit the analog electric signal having the frequency of the millimeter wave band to the extended remote head unit 320. A frequency of the millimeter wave band may be greater than or equal to 10 gigahertz (GHz).

Referring to FIG. 3, the extended remote radio head 320 includes an intermediate frequency converter 321 configured to convert the analog electric signal having the frequency of the millimeter wave band to the analog electric signal having an intermediate frequency with a baseband. The intermediate frequency may be lower than the frequency of the millimeter wave band. The intermediate frequency with a baseband may be determined to be a frequency less than or equal to 10 GHz.

Referring to FIG. 3, the extended remote radio head 320 includes a combiner 322 configured to combine the converted analog electric signal with at least one of a frequency synchronization signal, a time division duplex (TDD) switching control signal, or a monitoring and management signal for the host unit 330. The extended remote radio head 320 may receive the frequency synchronization signal, the time division duplex (TDD) switching control signal, and the monitoring and management signal from the basic remote radio head 310.

Referring to FIG. 3, the extended remote radio head 320 includes an analog optical transceiver 323 configured to convert the combined analog electric signal into the analog optical signal such that the combined analog electric signal is transmitted to the host unit 330. When the intermediate frequency with a baseband signal is determined to be the frequency less than or equal to 10 GHz, the analog optical transceiver 323 may include a laser diode, for example, a cost-effective directly modulated laser diode. Thus, costs of the analog optical transceiver 323 and the host unit 330 may be reduced.

With respect to an upstream direction from the radio unit 340 to the basic remote radio head 310, the radio unit 340, the host unit 330, the extended remote radio head 320, and the basic remote radio head 310 may reversely perform operations performed with respect to a downstream direction.

In more detail, the radio unit 340 may convert an analog radio signal received from a user terminal into an analog optical signal, and then transfer the converted analog optical signal to the host unit 330. The radio unit 340 may convert a frequency of a radio communication band into an intermediate frequency with a baseband signal in a process (frequency down conversion) of converting the analog radio signal into the analog optical signal.

The host unit 330 may transfer the received analog optical signal to the extended remote radio head 320. When the host unit 330 and a plurality of radio units are connected based on a point-to-multi point configuration, the host unit 330 may perform multiplexing on the analog optical signal of each of the radio devices and then transmit the multiplexed analog optical signals to the extended remote radio head 320.

The analog optical transceiver 323 of the extended remote radio head 320 may convert the received analog optical signal into the analog electric signal. The converted analog electric signal may be transmitted to the combiner 322. The combiner 322 may separate at least one of the frequency synchronization signal, the TDD switching control signal, or the monitoring and management signal from the analog electric signal. The separated the frequency synchronization signal, the TDD switching control signal, and the monitoring and management signal may be transmitted to the basic remote radio head 310. The intermediate frequency converter 321 may convert the intermediate frequency with the baseband of the analog electric signal into the frequency of the millimeter wave band (frequency up conversion). The converted analog electric signal may be transmitted to the basic remote radio head 310.

As described above, with respect to the upstream direction and the downstream direction, the basic remote radio head 310, the extended remote radio head 320, and the host unit 330 may not perform digital sampling, or not generate a digital frame. The digital sampling and the generating of the digital frame may be omitted and thus, the basic remote radio head 310, the extended remote radio head 320, and the host unit 330 may transmit a more volume of data at the same time than a digital type remote radio head and a digital type host unit. Thus, a volume of data to be processed by the basic remote radio head 310, the extended remote radio head 320, and the host unit 330 may be larger than that of the digital type remote radio head and the digital type host unit.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The units and/or modules described herein may be implemented using hardware components and software components. For example, the hardware components may include microphones, amplifiers, band pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

A number of embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claim.

What is claimed is:

1. A remote radio head connected to a host unit and a baseband unit, the remote radio head comprising:
 a digital optical transceiver configured to convert a digital baseband optical signal received from the baseband unit into a digital electric signal;
 a digital signal processor configured to deframe the converted digital electric signal;
 a digital-to-analog converter configured to convert the deframed digital electric signal into an analog electric signal;
 an analog front-end controller configured to adjust the level of the analog electric signal for optical transmission to the host device;
 a combiner configured to combine the analog electric signal of which the level is adjusted with at least one of a frequency synchronization signal, a time division duplex (TDD) switching control signal, or a monitoring and management signal for the host unit; and
 an analog optical transceiver configured to convert, into an analog optical signal, the analog electric signal combined with at least one of the frequency synchronization signal, the TDD switching control signal, or the monitoring and management signal.

2. The remote radio head of claim 1, further comprising:
 a switch configured to select and distribute the deframed digital electric signal for each of a plurality of host units, when multiple host units are connected to the remote radio head,
 wherein the digital-to-analog converter is configured to convert the digital electric signal classified into the analog electric signal for each of the host units.

3. The remote radio head of claim 1, wherein the digital signal processor is configured to separate, from the digital electric signal, digital information associated with the at least one of the frequency synchronization signal, the TDD switching control signal, or the monitoring and management signal.

4. The remote radio head of claim 3, wherein the combiner is configured to combine the analog electric signal with the at least one of the frequency synchronization signal, the TDD switching control signal, or the monitoring and management signal determined based on the digital information.

5. A host unit connected to a remote radio head and a radio unit, the host unit comprising:
 a first analog optical transceiver configured to convert an analog optical signal with a baseband received from the remote radio head into an analog electric signal;
 a splitter configured to separate, from the converted analog electric signal, at least one of a frequency synchronization signal, a time division duplex (TDD) switching control signal, or a monitoring and management signal for the host unit;
 an analog front-end controller configured to adjust the amplitude of the analog electric signal with the at least one of the frequency synchronization signal, the TDD switching control signal, or the monitoring and management signal for optical transmission between the host unit and the radio unit;
 a combiner configured to combine the analog electric signal of which the intensity is adjusted with at least one of the frequency synchronization signal, the TDD switching control signal, or the monitoring and management signal; and
 a second analog optical transceiver configured to convert the combined analog electric signal into an analog optical signal such that the combined analog electric signal is transmitted to the radio unit.

6. The host unit of claim 5, further comprising:
 a monitoring and management signal controller configured to control the radio unit in response to the monitoring and management signal.

7. The host unit of claim 5, wherein the analog front-end controller includes at least one of an amplifier or an attenuator configured to adjust the amplitude of the analog electric signal.

8. The host unit of claim 5, further comprising at least one of:
 a frequency synchronization signal controller configured to adjust the amplitude of the frequency synchronization signal input to the combiner for optical transmission between the host unit and the radio unit;
 a time division duplex (TDD) switching control signal controller configured to adjust the amplitude of the TDD switching control signal input to the combiner for optical transmission between the host unit and the radio unit; or a monitoring and management signal controller configured to adjust the amplitude of the monitoring and management signal input to the combiner for optical transmission between the host unit and the radio unit.

9. An extended remote radio head connected to a basic remote radio head, the extended remote radio unit comprising:

a frequency converter configured to convert an analog electric signal having a frequency of a millimeter wave band transmitted to a host unit by the basic remote radio head into an analog electric signal having an intermediate frequency with a baseband signal;

a combiner configured to combine the converted analog electric signal with at least one of a frequency synchronization signal, a time division duplex (TDD) switching control signal, or a monitoring and management signal for the host unit; and an analog optical transceiver configured to convert the combined analog electric signal into an analog optical signal such that the combined analog electric signal is transmitted to the host unit.

* * * * *